United States Patent [19]
George et al.

[11] 3,752,020
[45] Aug. 14, 1973

[54] COMBINED TOOL AND HOLDER

[76] Inventors: Stuart W. George, 21182 Van K Dr., Grosse Pointe, Mich. 48236; Henry R. Bucciero, 19674 Eastland Village Dr., Harper Woods, Mich. 48225

[22] Filed: Apr. 13, 1971

[21] Appl. No.: 133,668

[52] U.S. Cl. .................................... 82/36 R, 29/96
[51] Int. Cl. ............................................. B23b 29/22
[58] Field of Search ........................... 82/36, 37, 35; 29/96

[56] References Cited
UNITED STATES PATENTS
3,301,107 1/1967 George .................................... 82/36
2,041,251 5/1936 Klein ....................................... 82/35
FOREIGN PATENTS OR APPLICATIONS
837,592 6/1960 Great Britain .......................... 82/36

Primary Examiner—Leonidas Vlachos
Attorney—Allan J. Murray

[57] ABSTRACT

A tool holder having a shank forwardly terminating in a head elongated approximately vertically and formed with a mounting surface to receive a tool adjustable on the surface to be operative relative to a workpiece, a keeper to releasably retain the tool in position, and tool support means also adjustable, mountable upon the surface, the tool having an engageable portion which is engaged by the keeper and a machining portion, and said portions being so disposed relative to each other that resharpening of the machining portion leaves the engageable portion unaffected so that the entire engageable portion is usable throughout the life of the tool.

6 Claims, 7 Drawing Figures

Patented Aug. 14, 1973 3,752,020

INVENTORS
STUART W. GEORGE
HENRY R. BUCCIERO
BY Allan J. Murray ATTORNEY

COMBINED TOOL AND HOLDER

CROSS REFERENCES

There are no other applications pending by the inventor with respect to this invention, and no patents issued thereon.

FIELD OF INVENTION

Invention lies in the provision of the combination of a tool holder and a tool, with the tool being adapted for retention upon the tool holder and having a machining portion which may be successively resharpened, and consequently reduced in size, without affecting the size of the engageable portion, and to provide for up and down adjustment of the tool on the holder with a keeper adjustable to predetermined positions substantially corresponding to the positions available to the tool whereby the area of the tool which is engageable by the keeper remains substantially constant for the life of the tool.

DESCRIPTION OF PRIOR ART

The closest prior art known to applicant is U.S. Pat. No. 3,301,107. At the time this patent was issued, as may be seen in lines 5 through 20 in column 4 thereof, it was felt that a dovetailed tool could not be constructed so that the dovetail portion would remain unaffected by repeated grindings and sharpenings of the machining portion, and, indeed, the dovetail portion was diminished correspondingly to the machining portions with effects hereinafter discussed. Applicant believes the present disclosure to be an invention distinct from the aforesaid patent in that it does accomplish the goal of employing a dovetail clamping means, or, indeed, any other means for retaining a machining tool in a holder while affording resharpening of the tool without reducing the area (or engagement portion) by which the tool is retained in the holder.

An object of the invention is to provide a tool adjustable upon a tool holder whereon said tool may be clamped in any of a plurality of positions to appropriately establish its machining portion relative to a workpiece, and of a nature that grinding of the machining portion of the tool leaves the engageable portion thereof intact.

A further object is to provide a clamping means adjustable to a plurality of predetermined positions upon the tool holder to accomodate itself to the changing positions of the tool as the latter is worn by use and successive re-grindings.

Still a further object of the invention is to establish back-up, or support means for the tool to afford further resistance to the stresses imposed by machining operations.

Still a further object is to adapt the tool and the back-up member with provisions for making fine adjustments of the tool to establish said tool in an operative position relative to a workpiece.

These and various other objects are attained by the construction hereinafter described and illustrated in the accompanying drawings, wherein.

Figure 1:
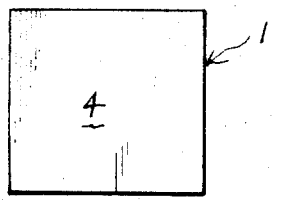
FIG. 1 is an end view of a shank carrying a tool holding head on its forward end portion.

In these views the reference character 1 designates the tool holder generally, and the reference character 2 designates the tool. The tool holder is formed with an approximately vertical head 3 disposed at the forward end of the holder and elongated upwardly and downwardly from the shank 4.

Figure 2:
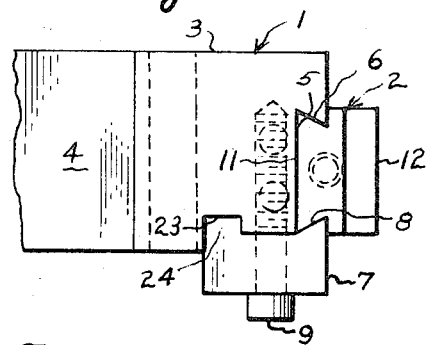
FIG. 2 is a partial plan view of the tool holding head taken in the direction of line 2—2 of FIG. 3.

A mounting surface 5 is formed on the forward face of the head and is flanked by a second surface 6 formed at an angle to the surface 5 to constitute a portion of a dovetail clamp as hereinafter explained. A keeper 7 is adjustably receivable on the side face of the head, and is formed with a third surface 8, which, when the keeper is applied to the head of the tool holder constitutes, the remaining face of a dovetail clamp, as is clear from FIG. 2. Screws 9 are received in any of a plurality of tapped holes 10, to afford upward and downward adjustment of the keeper on the head 3 of the tool holder 1. As illustrated, two such screws 9 are employed, but obviously, three may be utilized if it should be deemed desirable to increase either the stability of the keeper or to intensify clamping pressure upon the tool, or both.

Figure 3:
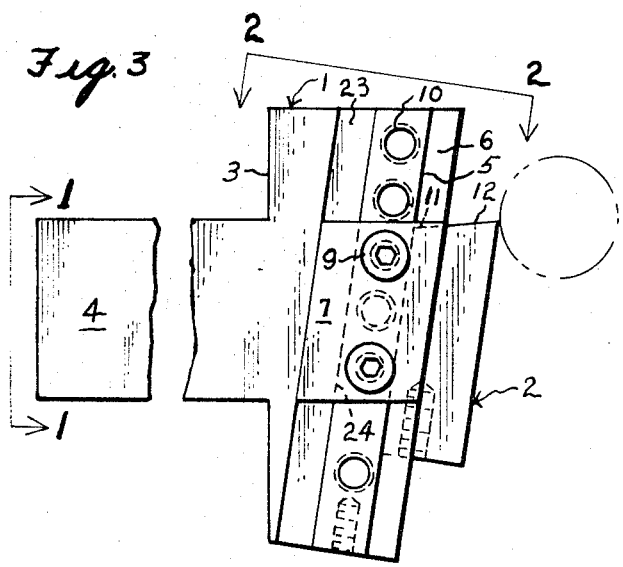
FIG. 3 is a side elevational view of the invention with the tool portrayed in an initial position for a tooling operation on a workpiece.
Figure 4:
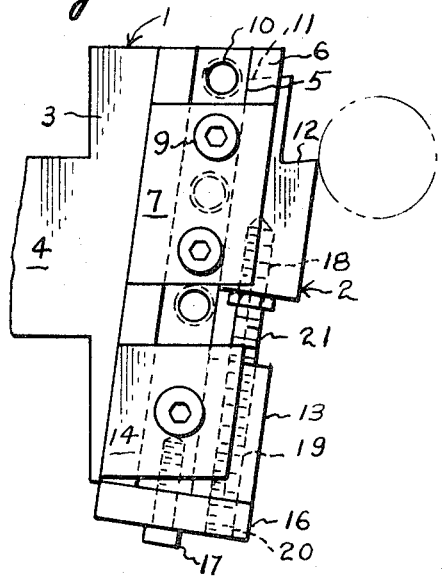
FIG. 4 is a view similar to FIG. 3, showing the tool adjusted upwardly on the tool holding head to compensate for wear resulting from resharpening, with the keeper adjusted accordingly, and with the supporting element and its keeper in position.
Figure 5:
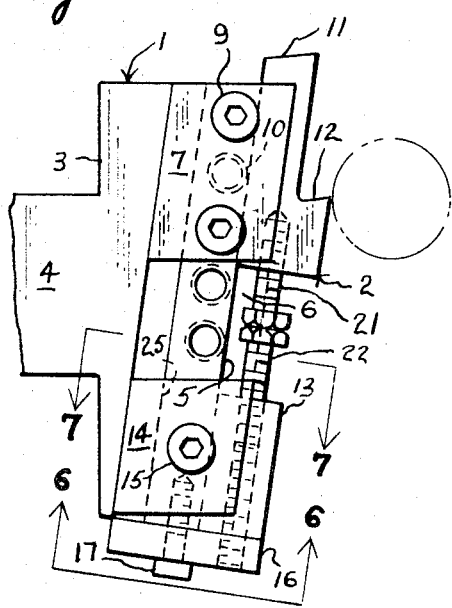
FIG. 5 is a view similar to FIGS. 3 and 4 portraying the tool in an advanced adjustment position, having been subjected to successive re-grindings and wear.
Figure 6:
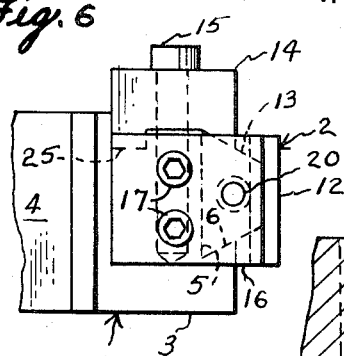
FIG. 6 is a partial bottom view of the head of the tool holder taken in the direction of line 6—6 of FIG. 5.
Figure 7:
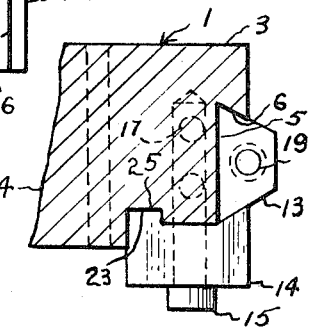
FIG. 7 is a partial, sectional view of the tool holder taken in the direction of line 7—7 of FIG. 5.

The tool is formed with an engageable portion in the form of a dovetail 11, and is further formed with a machining portion 12. FIGS. 3, 4, and 5 show the results of repeated grindings to sharpen the machining portion, which grindings have the effect of removing material, and "wearing away" the substance of the machining portion. In prior practice, the entire tool was ground away in the sharpening process with the result that as the vertical dimension of the machining portion of the tool was diminished by successive resharpening. So, too, was that portion of the tool by which the tool was engaged and retained in position on the holder. A consequence of this former practice is that stresses upon the tool resulting from machining operations become more and more concentrated in a smaller and smaller area by which the tool is engaged in a dovetail or similar clamp, with the result that frequently the clamping portion of the holder would yield, and would even break under the stresses concentrated in the smaller area of engagement. Obviously with the so far described arrangement, the engageable portion 2 of the tool remains constant, despite successive sharpenings of the machining portions of the tool, so that the stresses imposed during machining operations remain distributed throughout the same area during the life of the tool.

To further distribute such stresses, a support member 13 may be provided, said support member having dovetail shape. A second keeper 14 is secured, as by screws 15, which afford some vertical adjustability of the support member. If, and where desired, still a further distribution of stress may be effected by the employment of a back-up plate 16 secured to the bottom face of the head 3 of the tool holder as by screws 17.

To afford controlled, fine, vertical adjustment of the tool 2, it is proposed to form said tool with a tapped hole 18, while, similarly, tapped holes 19 and 20 are formed respectively in the support member 13 and the back-up member 16. Obviously the three tapped holes, which are aligned when the said elements 2, 13, and 16 are disposed upon the head 3 would allow a variety of combinations of screws or the like to effect said vertical adjustment, depending on the circumstances under which the tool may be used. As illustrated in FIG. 4, a hex-headed screw 21 has its head bearing upwardly on the bottom surface of the tool 2. In FIG. 5, a second such screw 22 is portrayed, the use of two such screws affording a greater versatility in adjustment. When the mounting portion of the tool begins to extend above the upper surface of the head 3, as shown in FIG. 5, the portion so protruding can be ground or cut off.

To ensure the stability of the keepers 7 and 14, in their clamping positions on the head 3 of the tool holder, it is proposed to form a groove 23 parallel to the mounting face 5, and a rib 24 is formed on the keeper 7 to engage in said groove to resist twisting of the keeper from its desired positions. A further rib 25 is formed on the second keeper 14, and, of course, serves the same purpose.

What I claim is:

1. The combination of a tool, and a holder mounting said tool, said holder being formed with,
   a mounting surface to mount said tool,
   a first keeper receivable on the holder to releasably engage said tool and retain said tool on said surface,
   means to releasably secure the keeper to the tool holder to effect engagement and retention of the tool,
   said tool being formed with an engageable portion adapted for such retention,
   said tool being further formed with a workpiece machining portion so disposed relative to said engageable portion that the latter remains substantially fully engageable upon the holder to effect said retention and is unaffected by successive resharpening of said machining portion throughout the diminishing life of the tool,
   said tool being adjustable up and down on said mounting surface to any of a plurlaity of positions, for effective operation on a workpiece, to compensate for diminishment of said machining portion from wear and successive resharpenings,
   said tool holder being adapted to receive said keeper in one or more alternative positions to effect substantially full retention of said engageable portion as said tool is adjusted up or down said mounting surface,
   a tool support element receivable on said surface,
   a second keeper to retain said tool support element in position on said mounting surface,
   means to releasably secure said second keeper to effect said retention, and
   means interacting between said tool and said support element to afford controlled sliding up and down adjustment of said tool on said mounting surface.

2. In the combination as set forth in claim 1, said engageable portion of said tool having lateral surfaces.
   a second surface formed upon said tool holder to retentively engage a lateral surface of said engageable portion of the tool,
   said keeper being formed with a third surface to engage the opposite lateral face of said engageable portion to clamp said portion between said second and said third surfaces.

3. The combination as set forth in claim 2,
   said lateral faces of said engageable portion being mutually, outwardly divergent, and
   said second and third surfaces being mutually, inwardly inclined to respectively engage with said respective lateral faces of said tool.

4. In a combination as set forth in claim 3, said tool support element being formed with lateral mutually, outwardly inclined surfaces, one of which engages said second lateral surface, and
   said second keeper having a third surface which coacts with said second surface and said mounting surface to clamp said tool support element on the holder.

5. In the combination as set forth in claim 4,
   a back-up element for said support element removably received by said holder to engage and reinforce said support element against stresses imposed by tooling operations.

6. In the combination as set forth in claim 5,
   said support element being adjustable relative to said tool and means interengaging between said support element and said back-up element and said tool to effect controlled sliding travel of said support element for such adjustment.

* * * * *